(12) United States Patent
Hirako

(10) Patent No.: US 8,713,448 B2
(45) Date of Patent: Apr. 29, 2014

(54) PORTABLE COMMUNICATION TERMINAL, COMMUNICATION METHOD AND CONTROL PROGRAM

(75) Inventor: Kenichi Hirako, Gifu (JP)

(73) Assignee: KYOCERA Corporation, Kyoto (JP)

( * ) Notice: Subject to any disclaimer, the term of this patent is extended or adjusted under 35 U.S.C. 154(b) by 554 days.

(21) Appl. No.: 13/056,579

(22) PCT Filed: Jul. 29, 2009

(86) PCT No.: PCT/JP2009/063529
§ 371 (c)(1),
(2), (4) Date: Jan. 28, 2011

(87) PCT Pub. No.: WO2010/013759
PCT Pub. Date: Feb. 4, 2010

(65) Prior Publication Data
US 2011/0138301 A1    Jun. 9, 2011

(30) Foreign Application Priority Data

Jul. 29, 2008    (JP) .................................. 2008-195034

(51) Int. Cl.
*G06F 3/00*        (2006.01)
(52) U.S. Cl.
USPC ......................................... 715/748; 715/751

(58) Field of Classification Search
USPC ......................................... 715/751
See application file for complete search history.

(56) References Cited

U.S. PATENT DOCUMENTS 7,143,194 B1 *  11/2006  Curley et al. ................. 709/248
2001/0005856 A1 *  6/2001  Tomikawa et al. ............ 709/208

FOREIGN PATENT DOCUMENTS

| JP | 2003-108409 A | 4/2003 |
| JP | 2006-319579 A | 11/2006 |
| JP | 2007-018383 A | 1/2007 |

* cited by examiner

*Primary Examiner* — Boris Pesin
*Assistant Examiner* — Matthew Ell
(74) *Attorney, Agent, or Firm* — Studebaker & Brackett PC

(57) ABSTRACT

A portable communication terminal includes a display unit, a memory that stores content information and community information, an identifier display unit that displays on the display unit a content identifier capable of identifying the content and a community identifier capable of identifying a community, a first identifier reception unit that receives a designation of the content identifier, an upload determination unit that determines whether upload of content to a community is possible based on the content information and the community information, and an upload display unit that displays the community identifier of a community determined as being uploadable to be distinguishable from another community identifier.

12 Claims, 12 Drawing Sheets

| NO | FILE | | | | MOVING PICTURE | | | | AUDIO | | | |
|---|---|---|---|---|---|---|---|---|---|---|---|---|
| | FILE NAME | REPRODUC-ING TIME | DATA SIZE | FORMAT | COMPRES-SION MODE | BAND | RESOLU-TION | FRAME RATE | COMPRES-SION MODE | BAND | SOUND SOURCE | FREQUENCY |
| 1 | MOVING PICTURE A | 2.5 MINUTES | 10.5MB | FLV | H.263 | 312Kbps | 320x240 | 15fps | MP3 | 64Kbps (VBR) | MONAU-RAL | 22050Hz |
| 2 | MOVING PICTURE B | 5.5 MINUTES | 23MB | WMV | H.264 | 312Kbps | 320x240 | 15fps | MP3 | 64Kbps (VBR) | MONAU-RAL | 22050Hz |
| 3 | MOVING PICTURE C | 5 MINUTES | 25MB | FLV | H.263 | 640Kbps | 800x480 | 15fps | MP3 | 64Kbps (VBR) | MONAU-RAL | 22050Hz |
| ... | ... | ... | ... | ... | ... | ... | ... | ... | ... | ... | ... | ... |

| NO | COMMUNITY NAME | FILE / FILE NAME | TIME LIMIT | DATA SIZE | CORRESPONDING FORMAT | MANAGING FORMAT | MOVING PICTURE / COMPRESSION MODE | BAND | RESOLUTION | FRAME RATE | AUDIO / COMPRESSION MODE | BAND | SOUND SOURCE | FREQUENCY |
|---|---|---|---|---|---|---|---|---|---|---|---|---|---|---|
| | | 236 | 260 | 240 | 242 | 262 | 244 | 246 | 248 | 250 | 244 | 246 | 252 | 254 |
| 1 | COMMUNITY A | ? | WITHIN 10 MINUTES | 100MB | WMV,AVI, MOV,MPG, FLV | FLV | H.263 H.264 On2VP62 | 350 KBPS OR LESS | 320x240 | 30 FPS OR LESS | MP3 | 64Kbps (VBR) | MON-AURAL | 22050Hz |
| 2 | COMMUNITY B | WITHIN 40 FULL-WIDTH CHARACTERS | UNLIMITED | 100MB | MPEG-4, MPEG-1, MOV,AVI, WMV,FLV, 3GP,3G2, AMC,VOB | ? | ? | ? | ? | ? | ? | ? | ? | ? |
| 3 | COMMUNITY C | ? | WITHIN 10 MINUTES | 100MB | .avi,.asf,.dv, .wmv,.mov, .pt,.3g2,.3gp, .3gp2,.3gpp, .gsm,.mpg, .mpeg,.mp4, .m4v,.mp4v, .cmp,.divx, .xvid,.264,.rm, .rmvb,.flv, .mkv,.ogm | FLV | H.263 H.264 On2VP62 | 350 KBPS OR LESS | 320x240 | 30 FPS OR LESS | MP3 | 64Kbps (VBR) | MON-AURAL | 22050Hz |
| 4 | COMMUNITY D | ? | | 100MB | WMV,AVI, MOV, MPG,FLV | | | | | | | | | |
| 5 | COMMUNITY E | ? | ? | 2MB | DivX6 | DivX6 | DivX6 | DivX6 | ? | 720x480 | ? | ? | ? | ? |
| ... | ... | ... | ... | ... | ... | ... | ... | ... | ... | ... | ... | ... | ... | ... |

|  |  | COMMUNITY NUMBER 256 | | | | | |
|---|---|---|---|---|---|---|---|
|  |  | 1 | 2 | 3 | 4 | 5 | ... |
| CONTENT NUMBER 234 | 1 | 65 | 80 | 80 | 50 | 80 | ... |
|  | 2 | 0 | 80 | 0 | 0 | 80 | ... |
|  | 3 | 50 | 100 | 80 | 60 | 80 | ... |
|  | ⋮ | ⋮ | ⋮ | ⋮ | ⋮ | ⋮ | ⋱ |

FIG. 12
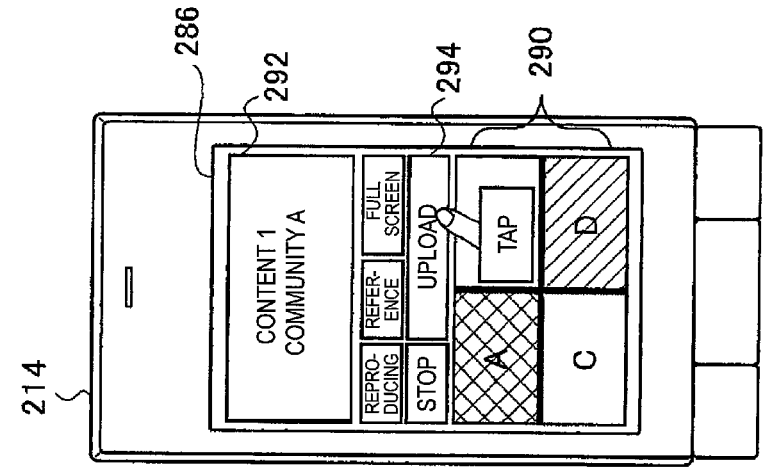
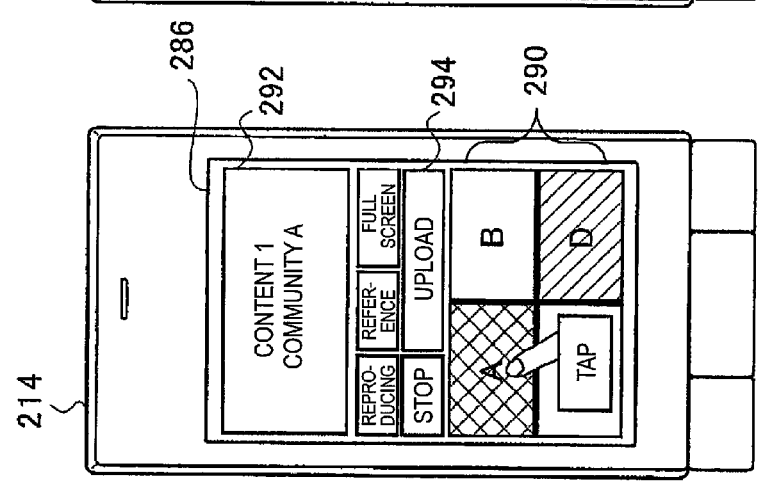
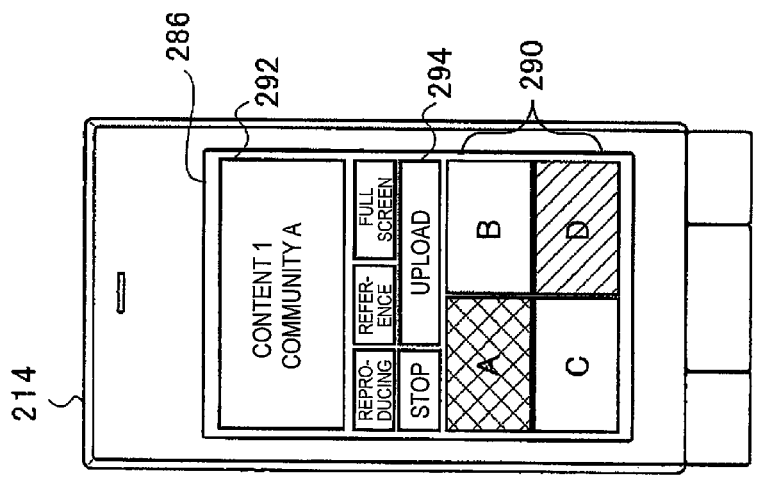

PORTABLE COMMUNICATION TERMINAL, COMMUNICATION METHOD AND CONTROL PROGRAM

TECHNICAL FIELD

The present invention relates to a portable communication terminal, a communication method and a control program which are capable of uploading content to a community.

BACKGROUND ART

In recent years, portable communication terminals such as portable telephone and PHS (Personal Handy phone System) terminal are widely spread, so that it is possible to make a call or to obtain information regardless of location or time. In particular, an amount of information that can be obtained is recently increased and a wireless communication method of high speed and high quality is adopted so as to download a large amount of data. The wireless communication method can transmit the large amount of data in the upload as well as in the download.

In addition, a technology is established which makes public contents such as images (still images and moving pictures) captured in the portable communication terminal and audio in a community on the Internet, through the data upload in the portable communication terminal. The contents that have been once made public are freely available by unspecified persons.

Conventionally, the upload of content has required some knowledge about a computer. However, a technology has been recently known which can automatically upload content such as still image and moving picture to a storage, which is provided at the outside, by an easy operation of simply pushing an upload button.

In addition, regarding a using method of the uploaded content, a technology has been known which totals vote information related to a specific image of an uploaded image group and determines content to be displayed on another terminal on the basis of the final total of the vote information.

In a community that is a public site of the contents, a size of content data that can be uploaded is often limited. Therefore, a technology has been also known which can automatically upload image data having a proper data size in accordance with types of a reception terminal.

SUMMARY OF THE INVENTION

Problems to be Solved

In the communities that make public the uploaded contents, formats to be stored are respectively determined. In addition, a format of content that can be created in the portable communication terminal is also limited. For example, while a format that is managed in the community is generally FLV (Flash Video), a moving picture that is imaged in the portable communication terminal is generally 3GPP (Third Generation Partnership Project) or MP4. When content having a format different from a format that can be stored in a community is uploaded, the format is converted in the community side.

However, since it takes a lot of time to perform the conversion process depending on the data size or format of the content, a user cannot immediately check the uploaded content. In addition, since it is not possible to expect when the conversion process will be completed, the user cannot determine whether the user shifts to another operation or stops the upload itself, so that the user unnecessarily wastes the time.

In order to check the uploaded content more quickly, it is effective to use a format that is recommended in a community when creating the content. However, in this case, the user should specifically know that the content having the limited format corresponds to which community. In addition, when uploading the content to a plurality of communities, the same number of formats as the number of the communities is to be prepared for one content. Thus, it is troublesome to manage the content in the portable communication terminal and an area of a memory is unnecessarily occupied.

In view of the above problems, an object of the present invention is to provide a portable communication terminal and a communication method which allow a user to check by visual means whether content can be uploaded to a community and to thus determine appropriateness of the upload.

Means for Solving the Problems

A portable communication terminal according to an aspect of the present invention comprises: a display unit; a memory that stores content information about content and community information about a community that is an upload destination of the content; an identifier display unit that displays on the display unit a content identifier capable of identifying the content and a community identifier capable of identifying the community; a first identifier reception unit that receives a designation of the content identifier; an upload determination unit that determines whether upload of the content specified by the received content identifier to the community specified by each community identifier is possible, based on the content information and the community information; and an upload display unit that displays the community identifier of the community determined as being uploadable to be distinguishable from another community identifier.

A portable communication terminal according to an aspect of the present invention comprises: a display unit; a memory that stores content information about content and community information about a community that is an upload destination of the content; an identifier display unit that displays on the display unit a content identifier capable of identifying the content and a community identifier capable of identifying the community; a first identifier reception unit that receives a designation of the community identifier; an upload determination unit that determines whether upload of the content specified by each content identifier to the community specified by the received community identifier is possible, based on the content information and the community information; and an upload display unit that displays the content identifier of the content determined as being uploadable to be distinguishable from another content identifier.

A communication method according to an aspect of the present invention comprises: storing content, content information about the content and community information about a community that is an upload destination of the content; displaying on a display unit a content identifier capable of identifying the content and a community identifier capable of identifying the community; receiving a designation of the content identifier; determining whether upload of the content specified by the received content identifier to the community specified by each community identifier is possible, based on the content information and the community information; and displaying the community identifier of the community determined as being uploadable to be distinguishable from another community identifier.

A control program according to an aspect of the present invention is a program of a portable communication terminal having a memory which stores content, content information about the content and community information about a community that is an upload destination of the content, the program capable of realizing: displaying a content identifier capable of identifying the content and a community identifier capable of identifying the community; receiving a designation of the content identifier; determining whether upload of the content specified by the received content identifier to the community specified by each community identifier is possible, based on the content information and the community information; and displaying the community identifier of the community determined as being uploadable to be distinguishable from another community identifier.

Effects of the Invention

As described above, according to the present invention, it is possible to allow a user to check by visual means the realization degree of upload of content to a community and to thus determine the appropriateness of the upload.

BRIEF DESCRIPTION OF THE DRAWINGS

FIG. 4 illustrates a configuration of a content table.

FIG. 5 illustrates a configuration of a community table.

FIG. 12 illustrates another operation example of a user interface.

DETAILED DESCRIPTION OF EMBODIMENTS

Figure 1:
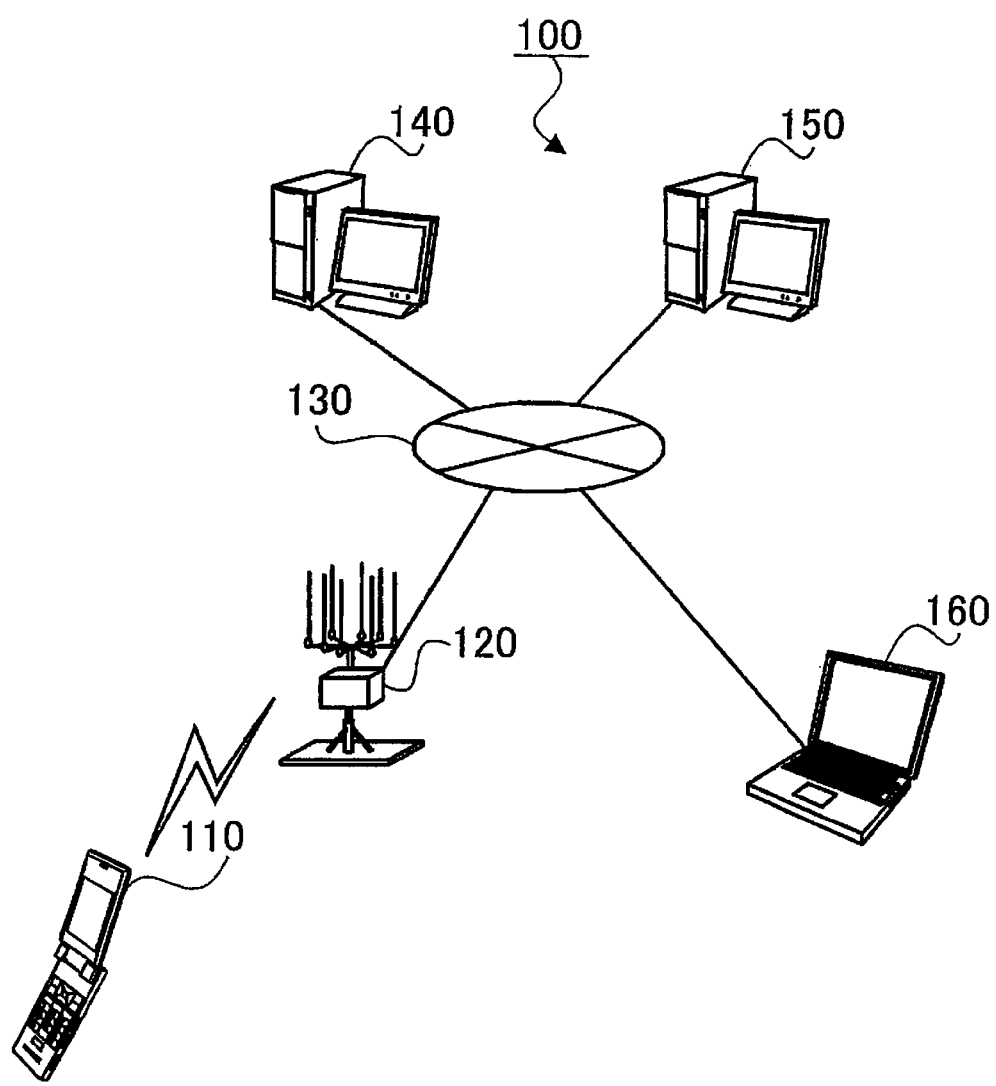
FIG. 1 illustrates a schematic connection relation of a wireless communication system.

Hereinafter, preferred embodiments of the present invention will be specifically described with reference to the drawings. The sizes, materials and other specific numerical values of the embodiments are exemplified so as to easily understand the invention and are not to limit the invention unless particularly mentioned otherwise. Meanwhile, in the specification and drawings, the elements having the substantially same functions and configurations are indicated with the same reference numerals and the overlapped explanations will be omitted. In addition, the elements that are not directly related to the invention will not be shown.

A portable communication terminal such as portable telephone and PHS terminal establishes a wireless communication system that performs wireless communication with a base station that is set up at a predetermined location. Herein, in order to easily understand the invention, the wireless communication system will be first described and then a specific configuration of the portable communication terminal and a communication method will be described.

(Wireless Communication System 100)

FIG. 1 illustrates a schematic connection relation of a wireless communication system 100. The wireless communication system 100 includes a portable communication terminal 110, a base station 120, a communication network 130 configured by ISDN (Integrated Services Digital Network) line, Internet, dedicated line and the like, a relay server 140, a community 150 and an external terminal 160. Here, the community 150 is an embodiment of a service that is operated by an external server connected to the communication network 130 and makes public an uploaded content.

In the wireless communication system 100 of this embodiment, when a user tries to upload content with the portable communication terminal 110, the portable communication terminal 110 transmits a request for wireless connection to the base station 120 that is within a communication range. The base station 120 having received the request for wireless connection transmits a request for communication connection with the community 150 to the relay server 140 through the communication network 130. The relay server 140 secures a communication path between the base station 120 and the community 150. Accordingly, the communication between the portable communication terminal 110 and the community 150 is established.

The portable communication terminal 110 uploads the content held therein to a server storage of the community 150 and the community 150 makes public the content to an access of another user. Another user can look through the public content by the external terminal 160.

Meanwhile, the community 150 prescribes a format that can be stored, respectively. Accordingly, when the content is uploaded with a format different from the storable format, it takes a lot of time at the community side to convert the format, so that the user cannot immediately check the uploaded content.

An object of this embodiment is to allow a user to check a degree of realization of upload of any content to a community at one time by uniform visual means and to thus determine appropriateness of the upload quickly and easily. A configuration of the portable communication terminal 110 realizing this embodiment will be specifically described in the below.

(Portable Communication Terminal 110)

Figure 2:
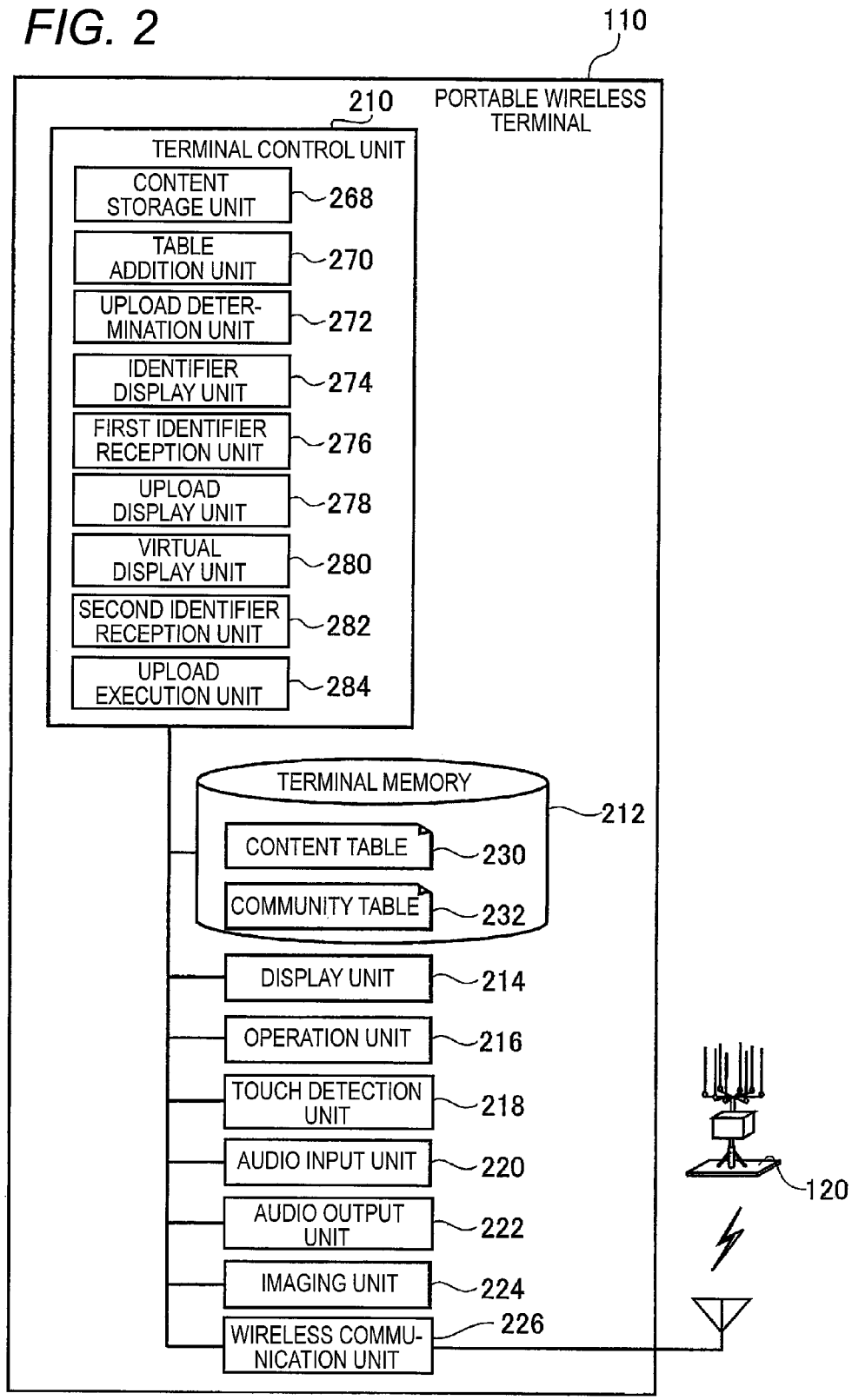
FIG. 2 is a function block diagram showing a hardware configuration of a portable communication terminal.
Figure 3:
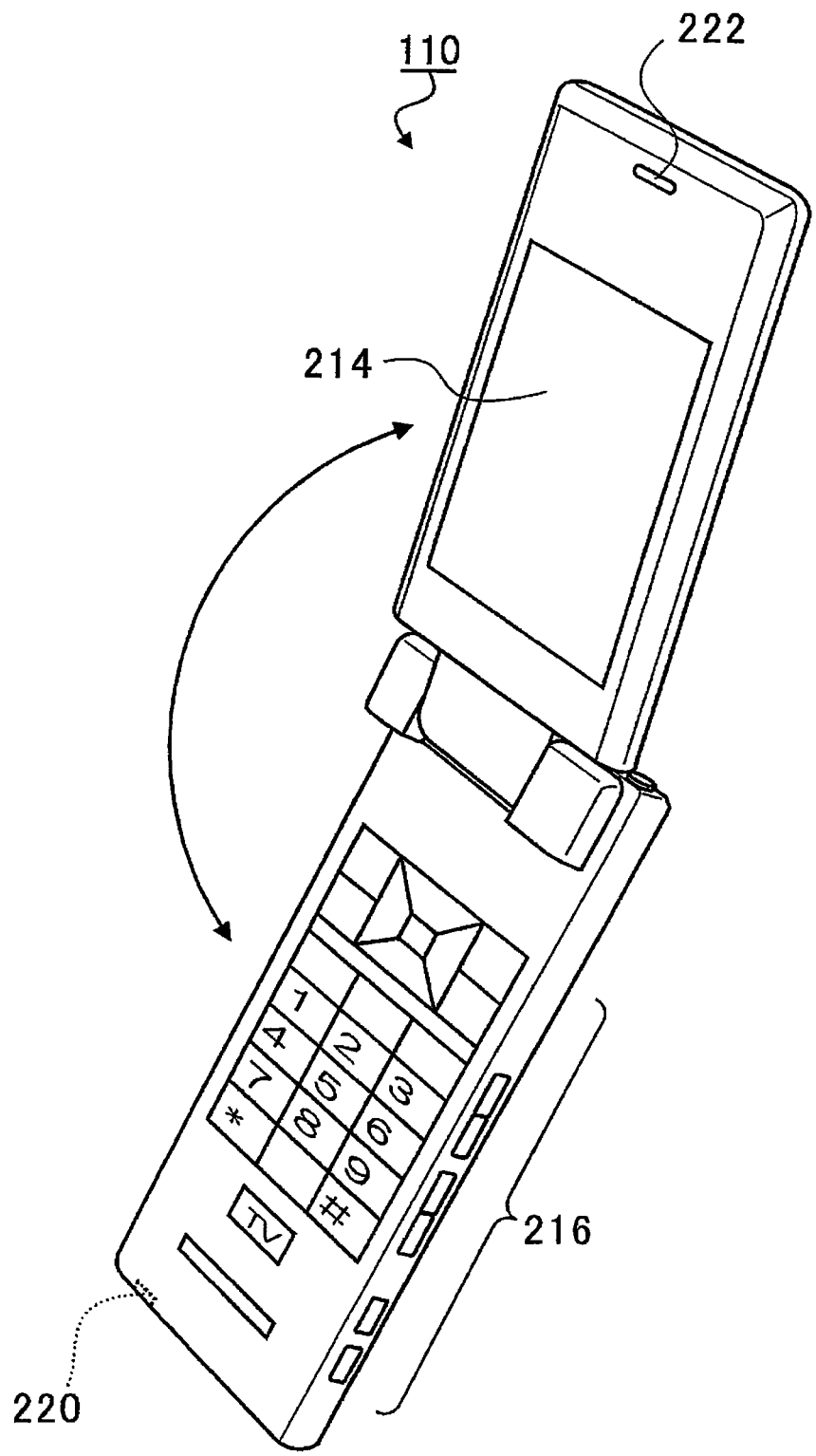
FIG. 3 is a perspective view showing an outward appearance of a portable communication terminal.

FIG. 2 is a function block diagram showing a hardware configuration of the portable communication terminal 110 and FIG. 3 is a perspective view showing an outward appearance of the portable communication terminal 110. The portable communication terminal 110 includes a control unit 210, a memory 212, a display unit 214, an operation unit 216, a touch detection unit 218, an audio input unit 220, an audio output unit 222, an imaging unit 224 and a wireless communication unit 226.

Herein, the portable telephone is exemplified as the portable communication terminal 110. However, the present invention is not limited thereto. For example, a variety of electronic devices capable of performing wireless communication such as PHS terminal, note-type personal computer, PDA (Personal Digital Assistant), digital camera, music player, car navigation, portable TV, gaming device, DVD player, remote controller and the like can be applied.

The control unit 210 manages and controls the portable communication terminal 110 by a semiconductor integrated circuit including a central processing unit (CPU) and performs calling, mail transmitting and receiving, imaging, music reproducing and TV watching functions by using programs of the memory 212. The memory 212 is configured by a ROM, a RAM, an EEPROM, a non-volatile RAM, a flash memory, an HDD and the like and stores programs, communication data and the like that are processed by the control unit 210.

In addition, the memory 212 also stores one or more contents including an image (moving picture or still image) that is imaged by the imaging unit 224, audio and text, a content table 230 in which content information about the contents is listed and a community table 232 in which community information about communities capable of uploading the contents is listed. Here, in a case where a plurality of memories 212 are provided, it doesn't matter that the content, the content table 230 and the community table 232 are stored in which one of the memories 212. In the meantime, the content may not be stored in the memory 212 of the portable communication terminal 110. In this case, it can be considered that the portable communication terminal 110 controls another terminal to upload content, which is stored in the terminal, to the community 150.

FIG. 4 illustrates a configuration of the content table 230. As shown in FIG. 4, the content table 230 indicates the content information about contents. The content information includes a content number 234, a file name 236, a reproducing time 238, a data size 240, a format 242, a compression mode 244, a band 246, a resolution 248, a frame rate 250, a sound source 252 and a frequency 254. In addition, when content is a picture or moving picture that is imaged by the imaging unit 224, an imaging date thereof may be included in the content table 230.

FIG. 5 illustrates a configuration of the community table 232. As shown in FIG. 5, the community table 232 indicates community information about communities. The community information includes a community number 256, a community name 258, a file name 236, a time limit 260, a data size 240, a format 242, a managing format 262, a compression mode 244, a band 246, a resolution 248, a frame rate 250, a sound source 252 and a frequency 254. "?" in FIG. 5 indicates an unknown item.

The display unit 214 is configured by a liquid crystal display, an EL (Electro Luminescence) display and the like and can display a Web content or GUI (Graphical User Interface) of an application that is stored in the memory 212 or provided from the community 150 through the communication network 130. The operation unit 216 is configured by a keyboard, a tenkey, and a movable switch such as joystick and the like and receives an operation input of a user.

The touch detection unit 218 receives an operation input of a user corresponding to a display on a surface of the display unit 214. As a detection method of the touch detection unit 218, the conventional methods such as a resistance film method (pressure-sensitive method), an electrostatic capacity method, an infrared light-shielding method, a ultrasonic surface acoustic wave method, an electromagnetic induction method, an electrostatic coupling method, an acoustic pulse recognition method, an image recognition method and the like may be used. In addition, a method of recognizing an object placed on the surface of the display unit 214 by an optical sensor integrated to the display unit 214 is also within the technical scope of this embodiment.

By the touch detection unit 218, it is possible to receive a user's intuitive input corresponding to the screen of the display unit 214 without using the operation unit 216, for example. In addition, by the touch detection unit, it is possible to perform analog operations such as scrolling and pointing of the web contents displayed on the display unit 214.

The audio input unit 220 is configured by audio recognition means such as microphone and the like and converts user's audio, which is input in making a call, into an electric signal that can be processed in the portable communication terminal 110. The audio output unit 222 is configured by a speaker and converts and outputs an audio signal of a called party, which is received in the portable communication terminal 110, into audio. In addition, the audio output unit can also output a ringtone, an operating sound of the operation unit 216, an alarm sound and the like.

The imaging unit 224 is configured by an image device such as CCD (Charge Coupled Device) or CMOS (Complementary Metal Oxide Semiconductor) and can capture an image such as still image or moving picture.

The wireless communication unit 226 establishes wireless communication such as WiMAX (Worldwide Interoperability for Microwave Access), WiFi and CDMA (Code Division Multiple Access) with the base station 120 through the network on a common link layer and performs voice communication with a called party or data communication with the community 150.

In addition, the control unit 210 also serves as a content storage unit 269, a table addition unit 270, an upload determination unit 272, an identifier display unit 274, a first identifier reception unit 276, an upload display unit 278, a virtual display unit 280, a second identifier reception unit 282 and an upload execution unit 284.

The content storage unit 268 stores contents, which are obtained through functions of the portable communication terminal 110 (an imaging function of the imaging unit 224, a recording function of the audio input unit 220 and an input function of letters and the like by the operation unit 216 or touch detection unit 218), in the memory 212, as upload objects. In addition to the functions of the portable communication terminal 110, it is possible to store contents that are obtained through other communication routes such as communication network 130, USB (Universal Serial Bus), infrared and NFC (Near Field Communication).

When content is added by the content storage unit 268, the table addition unit 270 adds content information about the content to the content table 230. In addition, when a community is added, community information about the community is added to the community table 232. Specifically, the table addition unit downloads the community information of the respective communities 150 through the communication network 130 and updates the community table 232 by the contents. Alternatively, the community information may be obtained by reading a two-dimensional barcode with the imaging unit 224 or USB or infrared communication.

When the content specified by a content identifier that will be described below is uploaded to the community 150 specified by a community identifier that will be described below, the upload determination unit 272 calculates a possibility of content upload or a degree of realization of the upload, based on each combination of the content information of the content table 230 and the community information of the community table 232. By the possibility of the upload or degree of realization thereof, it is possible to quantitatively know the appropriateness of upload of any content to any community 150.

Specifically, the upload determination unit 272 calculates a degree of realization by integrating a weighting value to one or more parameters selected from a group including (1) whether upload is possible, (2) whether re-encoding is necessary and (3) whether DEMUX and MUX are necessary.

(1) Regarding whether upload is possible, the upload determination unit 272 determines whether upload is impossible due to one cause of content and community.

The elements determining whether upload is possible include the time limit 260, the data size 240 and the format 242, for example. Regarding the time limit 260, for example, 10 minutes or less of the time limit 260 of the community 150, when the reproducing time 238 of the content is 12 minutes, it is determined that upload is impossible. Regarding the data size 240, for example 100 MB of the data size 240 of the community 150, when the data size 240 of the content is 120 MB, it is determined that upload is impossible. Regarding the format 242, when the format 242 of the content, i.e., DivX6 does not come within a group of the formats 242 that the community can accept, for example, a group of WMV, AVI and FLV, it is determined that upload is impossible.

When upload is impossible, 0 point (zero) is applied to an index A indicating whether upload is possible and a following integration is not performed. When upload is possible, 10 points are applied to the index A and the calculation of the degree of realization is continuously performed.

(2) Regarding whether re-encoding is necessary, it is determined whether re-encoding is necessary. When an encode mode permitted in the community 150 (for a moving picture, the compression mode 244, the band 246, the resolution 248, the frame rate 250 and the like and for audio, the compression mode 244, the band 246, the sound source 252, the frequency 254 and the like) is different from an encode mode of the content for which the degree of realization is calculated, re-encoding is necessary.

First, it is determined whether re-encoding is necessary for moving picture data of content that is an object. When re-encoding is not necessary, $\alpha=0$ and when re-encoding is necessary, $\alpha=1$. In addition, when re-encoding is not necessary for audio data of content, $\beta=0$ and when re-encoding is necessary, $\beta=1$. Here, when a bit rate of a moving picture is V and a bit rate of audio is A, an index B, which indicates whether re-encoding is necessary, is as follows: $B=(1-((\alpha \times V+\beta \times A)/(V+A))) \times$weighting value. Here, the weighting value is 70 points. Accordingly, a maximum of the index B is 70 points and when $\alpha=\beta=1$, the index B is 0 point.

The necessary time for the re-encoding is different depending on combinations of compression modes before the compression and compression modes after the compression (for example, H.263 and H.264 and the like), the descriptions thereof are omitted in the specification so as to easily understand the invention. In the meantime, a combination of compression modes may be considered.

In addition, regarding the calculation of the index B, a calculation table is generated from degrees of processing loads for each combination based on actually measured values under actual communication environments, which table may be used for the calculation.

(3) Regarding whether DEMUX (DE MUltipleXer) and MUX (MUltipleXer) are necessary, it is determined whether DEMUX and MUX are necessary. When a format that is permitted in the community 15 is different from a format of content for which the degree of realization is calculated, it is determined that DEMUX and MUX are necessary. Here, when DEMUX and MUX are necessary, an index C is 0 point and when they are not necessary, 20 points are applied to the index C.

By summing the calculated three parameters, i.e., indices A, B and C, the upload determination unit 272 obtains the sum (A+B+C) and a result of the calculation is used to as the degree of realization. A maximum of the degree of realization is 100 points (10 points (index A)+70 points (index B)+20 points (index C)). Herein, the point distribution is determined by an inventor's experience and can be appropriately changed depending on using aspects of the portable communication terminal 110. In addition, the point distribution of the three parameters may be 1:1:1 without the weighting calculation.

By the parameters and the weighting thereof, it is possible to appropriately calculate the degree of realization indicating the appropriateness of upload.

Figures 6, 7:
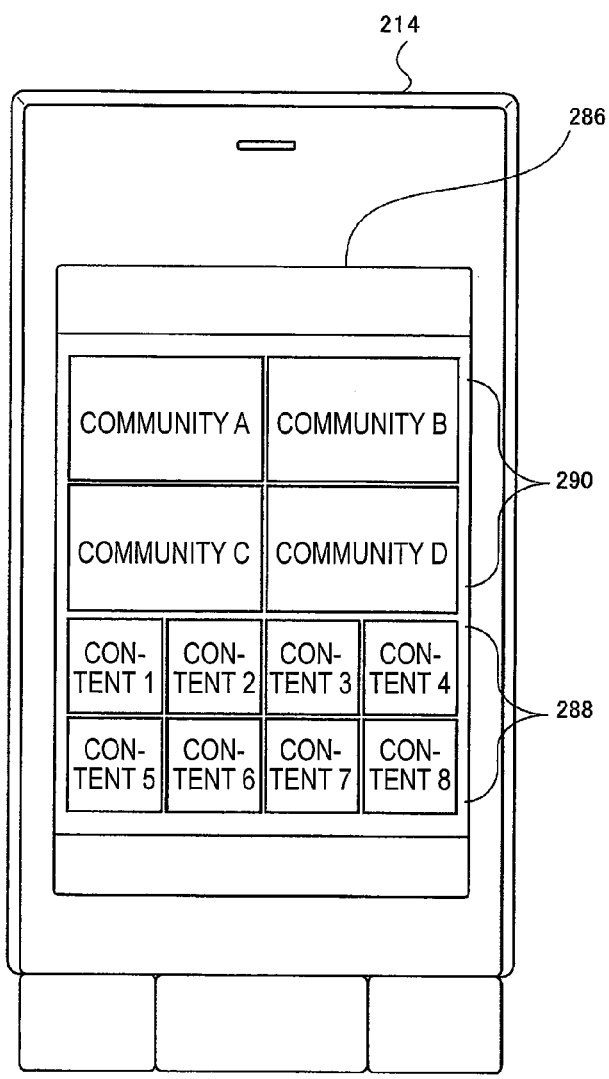
FIG. 6 illustrates a degree of realization that is calculated by an upload determination unit.
FIG. 7 illustrates a user interface that displays identifiers.

FIG. 6 illustrates a degree of realization that is calculated by the upload determination unit 272. Here, the row indicates a content number 234 and the column indicates a community number 256. That is, the degree of realization is generated in correspondence to all content information of the content table 230 and all community information of the community table 232.

After an identifier display unit 274, which will be described below, displays content identifiers and community identifiers, the upload determination unit 272 may perform determination as any content identifier or any community identifier, which becomes a candidate, is selected. Here, the content identifier is an identifier such as file name 236, for example, which can identify content, and is related to content and content information. Accordingly, it is possible to specify both the content and the content information from the content identifier or vice versa. In addition, it is possible to specify both the community and the community information from the community identifier or vice versa.

When the degree of realization is frequently calculated for all combinations of the content table 230 and the community table 232, accompanied by addition, change and deletion of the content or community, the processing load may be increased. Accordingly, as any content identifier or any community identifier is selected, i.e., when at least one of the identifiers is selected, the degree of realization is calculated for only a combination with the corresponding one side identifier, so that the processing load can be reduced to 1/(element number of table), for example.

The identifier display unit 274 starts up a user interface to display the content identifiers and the community identifiers on the display unit 214.

FIG. 7 illustrates a user interface 286 that displays identifiers. Here, the user interface 286 is displayed on the display unit 214. On the user interface 286, identifiers 288 that show content information and identifiers 290 that show community information are indicated. The identifiers 288, 290 may be specified by text display such as file names 236, community names 258 and the like. Alternatively, the identifiers may be specified by thumbnails, marks indicating communities and the like.

After the identifier display unit 274 displays the user interface 286, when content that is an upload object or a community that is an upload destination is specified (selected), the first identifier reception unit 276 receives the corresponding content or community.

When the first identifier reception unit 276 selects any content identifier 288, the upload display unit 278 displays degrees of realization in the case where the selected content is uploaded to the respective communities, in relation to the displayed community identifiers 290. Particularly, in this embodiment, the upload display unit 278 displays the degrees of realization by coloring the identifiers.

Figures 8, 9:
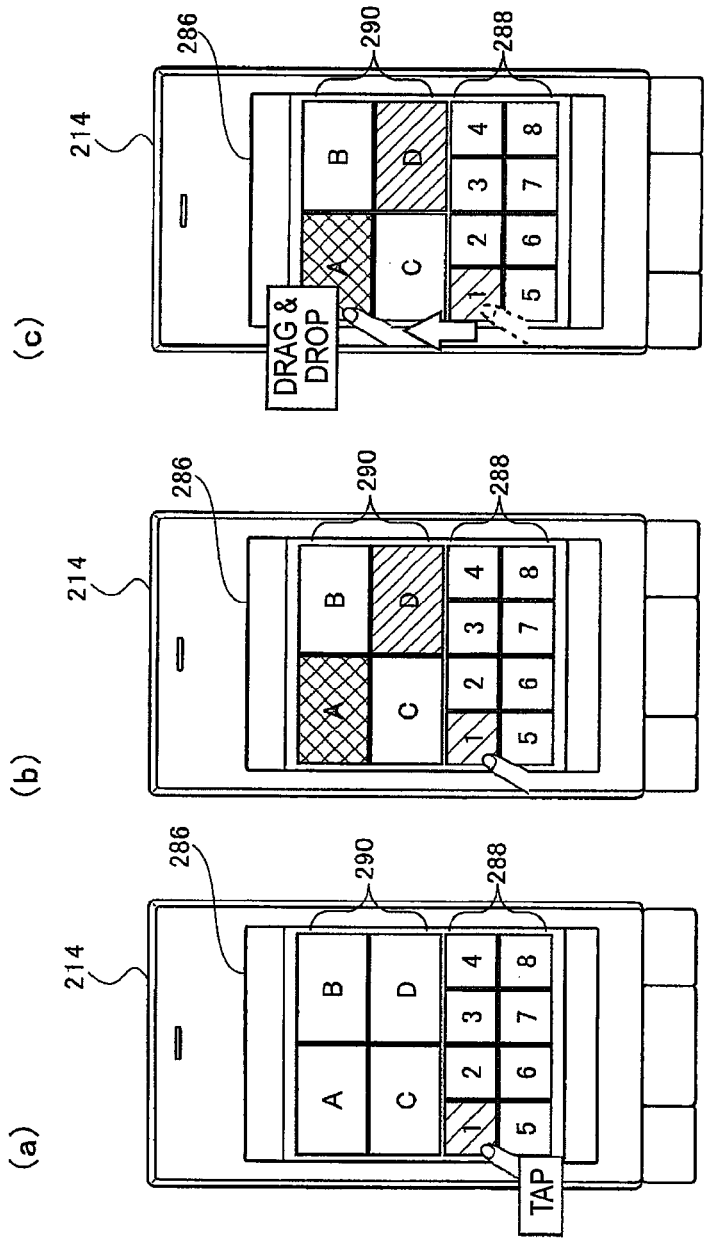
FIG. 8 illustrates a relation between a degree of realization and coloring.
FIG. 9 illustrates an operation example of a user interface.

FIG. 8 illustrates a relation between a degree of realization and coloring. Referring to FIG. 8, when the degree of realization is between 0 and 50 points, the identifier is colored with white, when the degree of realization is between 51 and 80 points, the identifier is colored with yellow and when the degree of realization is between 81 and 100 points, the identifier is colored with green. In addition, when the degree of realization is 0 point, the upload is impossible and the identifier is colorless and may be grayout. Here, only the four stages are provided. However, it is needless to say that more stages may be provided by various colors.

According to the above configuration, a user can recognize the degrees of realization visually and intuitively, so that the user can determine the appropriateness of upload quickly and easily. In addition, it is possible to know the necessary time for upload by a difference of colors, so that the user can cope with various situations. For example, when a user has plenty of time, the user may select a yellow community and when the user has no time, the user may select only a green community. In the meantime, the degree of realization may be displayed while associating the reduced points with the community identifier 290. Alternatively, the degree of realization may be displayed while associating the mark corresponding to the degree of realization with the community identifier 290.

Figure 10:
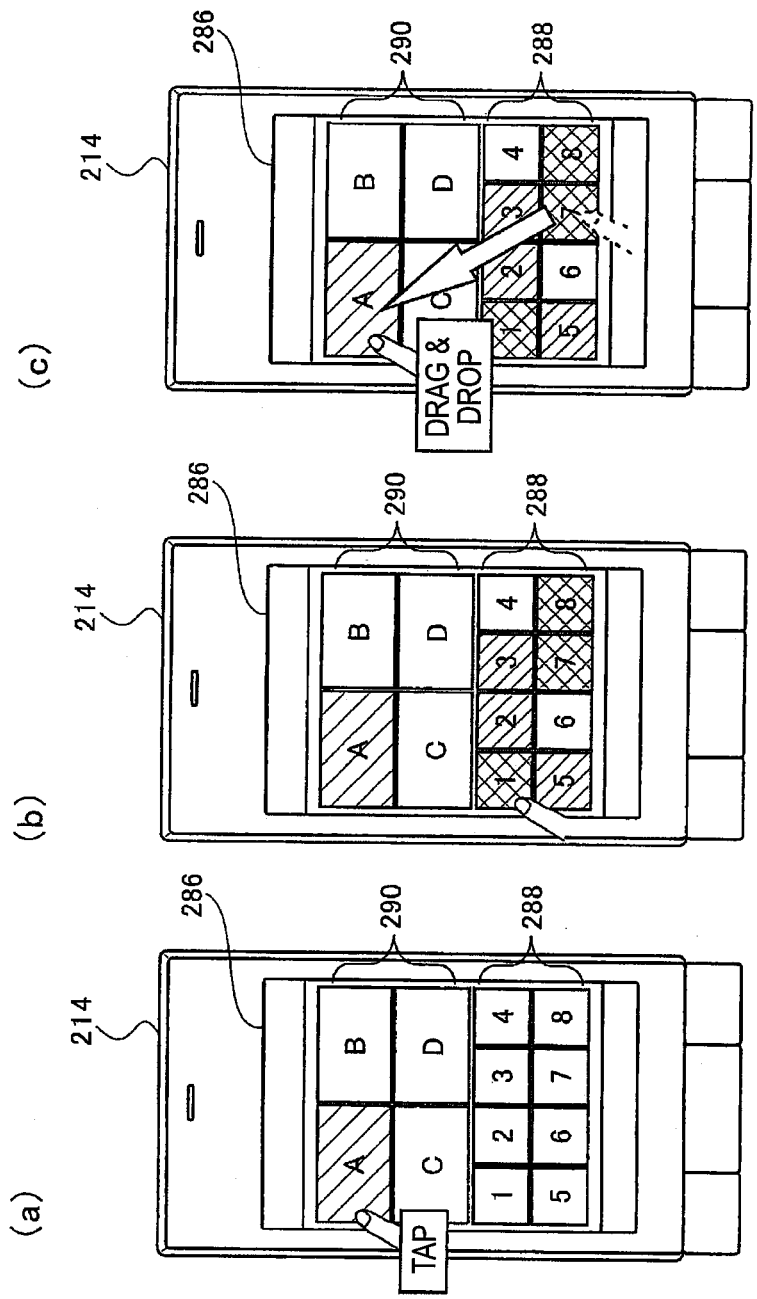
FIG. 10 illustrates an operation example of a user interface.

FIGS. 9 and 10 illustrate operation examples of the user interface 286. As shown in FIG. 9(*a*), a user first selects (taps) the content identifier 288. When the content identifier 288 is selected, the upload display unit 278 displays the degrees of realization in the case where the selected content is uploaded to each community, in relation to the community identifiers 290, as shown in FIG. 9(*b*). Here, the community A is displayed with green and the community D is displayed with yellow. This indicates that the upload to the community A is proper. In the meantime, since it is determined that the upload to the communities B and C is impossible in FIG. 10(*b*), the communities are not colored.

When the user determines the upload to the community A, the user overlaps the content 1 on the community A with drag and drop. In the meantime, when changing the selected content, the color of the community identifier 290 is changed to a color corresponding to the content.

In addition, as shown in FIG. 10(*a*), when the user first selects the community identifier 290, for example community A, the upload display unit 278 displays the degrees of realization in the case where each content is uploaded to the selected community, in relation to the content identifiers 288, as shown in FIG. 10(*b*). Here, the contents 1, 7, 8 are displayed with green and the contents 2, 3, 5 are displayed with yellow. This indicates that the upload of the contents 1, 7, 8 is proper. When the user determines the upload of the content 7, the user overlaps the content 7 on the community A with drag and drop, as shown in FIG. 10(*c*). In the meantime, since it is determined that the upload of the contents 4, 6 is impossible, the contents are not colored.

As described with reference to FIGS. 9 and 10, according to the portable communication terminal 110 of this embodiment, the degrees of realization of the upload of selected content to the respective communities can be displayed at one time by the visual means. Thus, a user can quickly and easily determine to which community the upload is possible and to which community the content should be uploaded.

In addition, according to the portable communication terminal 110 of this embodiment, the uploadable content identifier 288 or community identifier 290 is displayed to be distinguishable from other identifiers and then the designation of the identifier that is displayed to be uploadable is received (selected), so that the specified content is uploaded to the community. According to this configuration, it is possible to upload the content with the simple operation of just selecting the identifier that is displayed to be uploadable.

Furthermore, according to the portable communication terminal 110 of this embodiment, the degrees of realization in the case where the selected content is uploaded to the respective communities or the degrees of realization in the case where the respective contents are uploaded to the selected community are displayed in relation to the respective identifiers. According to this configuration, it is possible to perform the upload of content with the simple operation of just selecting the identifier that is displayed to have a high degree of realization of the upload. Further, when the combination having a high degree of realization is selected, it is possible to minimize the necessary time for upload completion. Thus, it is possible to quickly check the uploaded content.

In addition, as described above, the content identifier 288 may be displayed by a thumbnail. In this case, the upload display unit 278 colors edges of the thumbnail.

Figure 11:
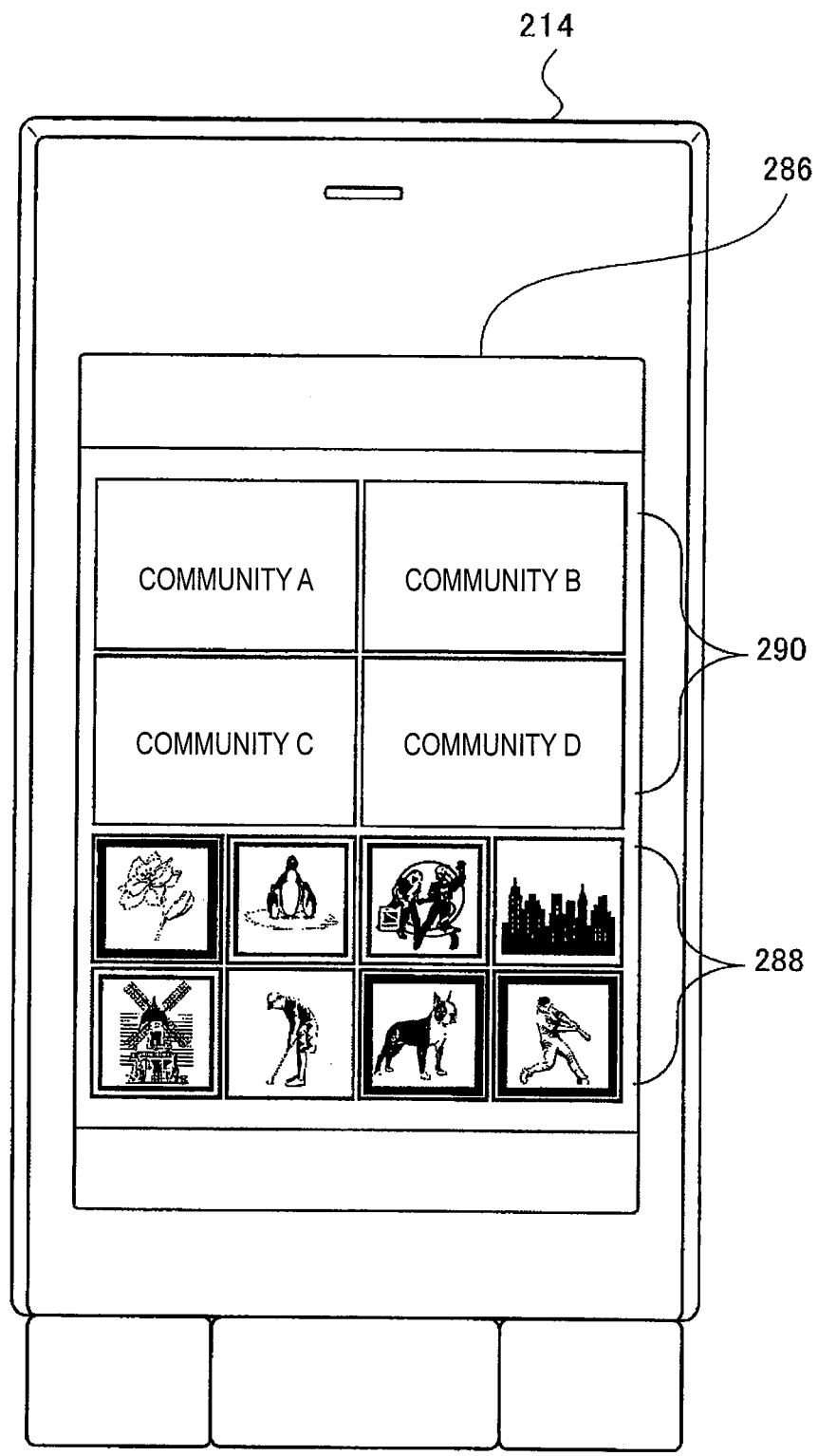
FIG. 11 illustrates another example of a user interface.

FIG. 11 illustrates another example of the user interface 286. Here, the content identifiers 288 are displayed by thumbnails and the surroundings thereof are colored in correspondence to FIG. 8. Therefore, a user can securely transmit intended content while referring to the thumbnails.

The virtual display unit 280 virtually displays a looking state when any selected content is uploaded to the any selected community 150.

Figure 13:
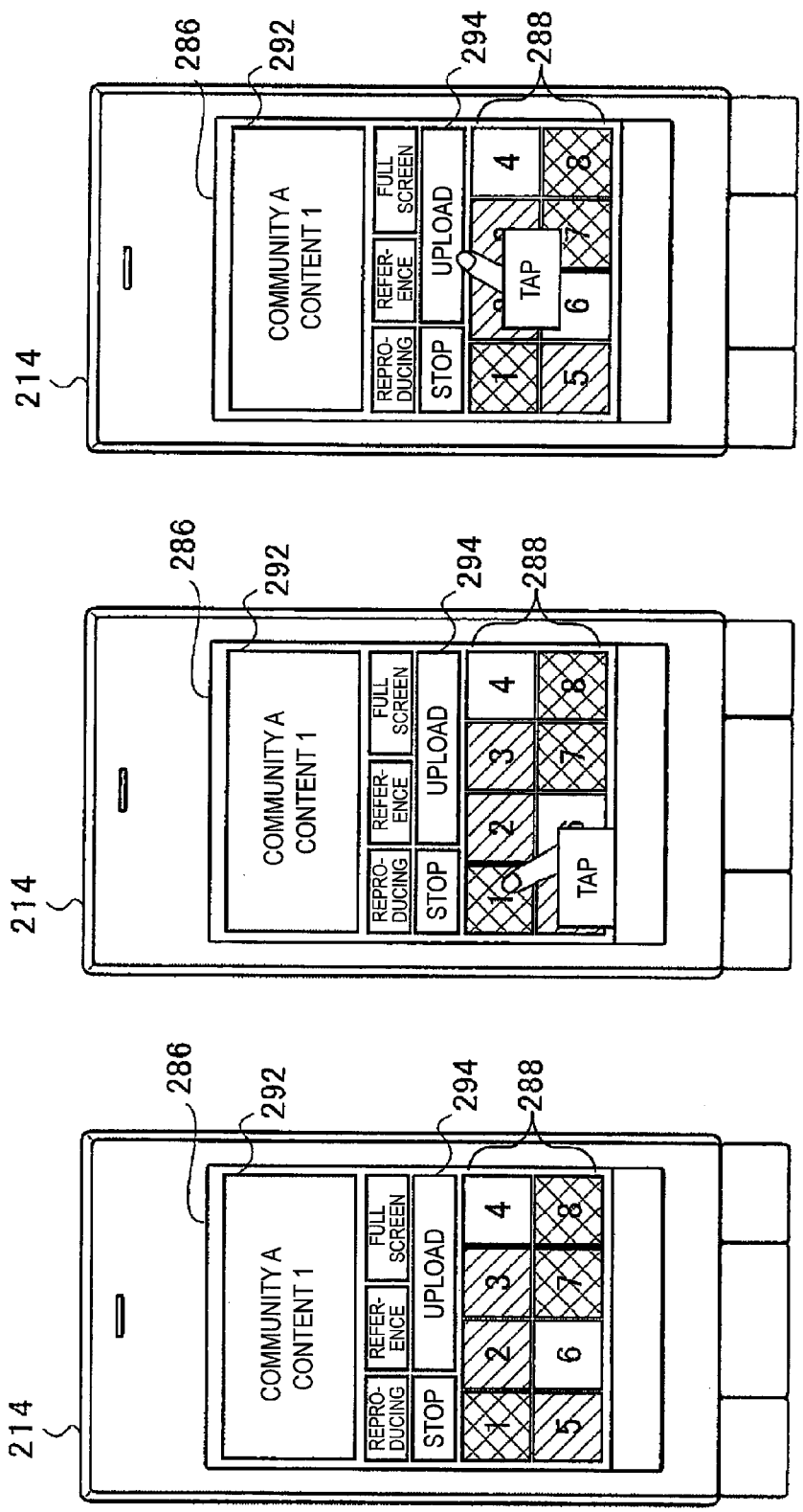
FIG. 13 illustrates another operation example of a user interface.

FIGS. 12 and 13 illustrate another operation example of the user interface 286. When the user selects the content identifier 288, for example content 1, the content 1 is fixed and the upload display unit 278 displays the degrees of realization in the case where the selected content 1 is uploaded to the respective communities, in relation to the community identifiers 290, as shown in FIG. 12(*a*). In addition to this, the virtual display unit 280 virtually displays on a virtual screen 292 a looking state when any selected content is uploaded to the any selected community 150.

Similarly to FIG. 9, when the user determines the upload to the community A, the user selects (taps) the community A, as shown in FIG. 12(*b*), and then continuously selects (taps) an upload button 294, as shown in FIG. 12(*c*). Accordingly, the content 1 is uploaded to the community A.

In addition, when the user first selects the community identifier 290, for example community A, the community A is fixed and the upload display unit 278 displays the degrees of realization in the case where the respective contents are uploaded to the selected community A, in relation to the community identifiers 290, as shown in FIG. 13(*a*). In addition to this, the virtual display unit 280 virtually displays a looking state on the virtual screen 292.

When the user determines the upload to the community A, the user selects (taps) the content 1, as shown in FIG. 13(*b*), and then continuously selects (taps) the upload button 294, as shown in FIG. 13(*c*). Accordingly, the content 1 is uploaded to the community A.

According to the above configuration, the user can perform the upload while checking not only the appropriateness of upload but also the looking state after the upload. Accordingly, it is possible to avoid a state that the actual looking state is displayed against the intention or a state that the user is forced to perform a troublesome deleting process.

When content that is an upload object or a community that is an upload destination is specified (selected) through the user interface 286, the second identifier reception unit 282 receives the corresponding content or community.

The upload execution unit 284 uploads the content, which is an upload object and is received through the user interface 286, to the community 150 that is an upload destination.

(Communication Method)

Next, a communication method of operating content with the portable communication terminal 110 will be described.

Figure 14:
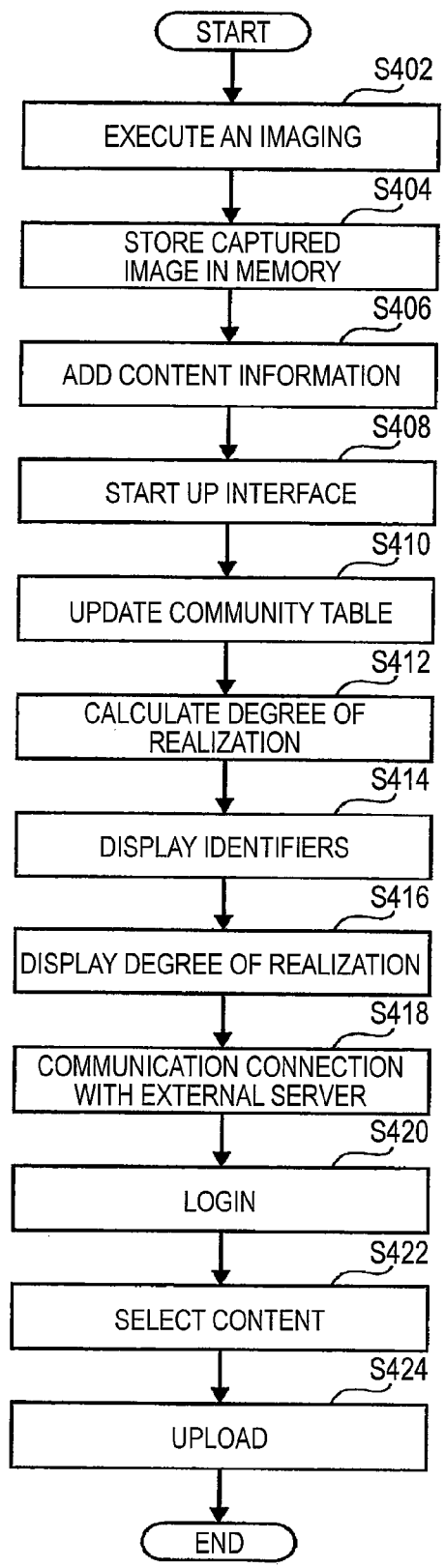
FIG. 14 is a flow chart showing a communication method of a content upload.

FIG. 14 is a flow chart showing a communication method for a content upload. The content table 230 and the community table 232 are stored in the memory 212 in advance.

A user executes a desired imaging with the portable communication terminal 110 (S402). The content storage unit 268 stores, as uploadable content, the captured image (moving picture or still image) in the memory 212 (S404). At this time, as the content is added, the table addition unit 270 adds content information about the content to the content table 230 (S406).

Then, when the user tries to upload the content stored in the memory 212, the user starts up the user interface through the portable communication terminal 110 (S408) and the table addition unit 270 accesses to the respective communities 150 registered in the community table 232 to download the latest community information and updates the community table 232 in the memory 212 (S410). After that, the update of the tables 230, 232 is prohibited until the user interface is ended.

In addition, the upload determination unit 272 calculates a degree of realization in the case where content that is specified by the content identifier is uploaded to the community that is specified by the community identifier, based on any content information of the updated community table 232 and any community information of the community table 232 (S412).

The identifier display unit 274 displays the content identifiers 288 and the community identifiers 290 on the display unit 214 (S414). Then, when any content identifier is selected, the virtual display unit 280 displays the degrees of realization in the case where the content that is specified by the selected content identifier is uploaded to the respective communities, in relation to the community identifiers 290 (S416).

That is, when the content that is desired to be uploaded and the community that is an upload destination are determined, the upload execution unit 284 uploads the content to the community. Specifically, the upload execution unit 284 performs communication connection with the community 150 through the base station 120 and the communication network 130 (S418) and inputs account information to log in the community 150 (S420). Then, the content that is desired to be uploaded is selected in accordance with the user input (S422) and a process of uploading the content is performed (S424).

Also in the above communication method, it is possible to allow a user to check the degrees of realization of upload of any content to communities at one time by the uniform visual means and to thus determine the appropriateness of the upload quickly and easily.

Although the preferred embodiments of the invention have been described, it should be noted that the present invention is not limited thereto and can be modified and changed by one skilled in the art within the scope of the claims, which are intended to be included in the technical scope of the present invention.

For example, in the above embodiments, the upload determination unit 272 functions as the identifier display unit 274 starts up the user interface 286. However, the present invention is not limited thereto. For example, when the community information is updated, the upload determination unit may function at the update detection time. In addition, the upload determination unit may function on the background at the time having no relation to the execution of the user interface.

In the above embodiments, the identifier display unit displays the content identifier and the community identifier in parallel. However, the timing of displaying both identifiers is not limited thereto. For example, the content identifier may be first displayed and then the corresponding community identifier may be displayed after the first identifier reception unit receives the designation of the content identifier. In addition, the community identifier may be first displayed and then the corresponding content identifier may be displayed after the first identifier reception unit receives the designation of the community identifier.

In the above embodiments, the touch detection unit 218 receives a user's input such as selection of content identifier or community identifier while matching to the display screen of the display unit 214. However, a button of the operation unit 216 corresponding to the display of the display unit 214 may be pushed. Alternatively, a separate display unit may be used to receive a user's input.

In the meantime, the respective processes of the communication method are not necessarily performed time-serially in accordance with the procedures shown in the flow chart and may be performed in parallel or include processing by a subroutine.

This application claims the priority of Japanese Patent Application No. 2008-195034 filed on Jul. 29, 2008, the disclosures of which are incorporated herein by reference.

INDUSTRIAL APPLICABILITY

The present invention can be applied to a portable communication terminal that can upload content to a community and a communication method thereof.

DESCRIPTIONS OF REFERENCE NUMERALS

110: portable communication terminal
150: community
212: memory
214: display unit
230: content table
232: community table
270: table addition unit
272: upload determination unit
274: identifier display unit
276: first identifier reception unit
278: upload display unit
280: virtual display unit
282: second identifier reception unit
284: upload execution unit
286: user interface

The invention claimed is:

1. A portable communication terminal comprising:
a display unit;
a memory that stores content information about content and community information about a community that is an upload destination of the content;
an identifier display unit that displays on the display unit a content identifier capable of identifying the content and a community identifier capable of identifying the community;
a first identifier reception unit that receives a designation of the content identifier;
an upload determination unit that determines whether upload of the content specified by the received content identifier to the community specified by each community identifier is possible, based on the content information and the community information; and
an upload display unit that displays the community identifier of the community determined as being uploadable to be distinguishable from another community identifier,
wherein the upload determination unit calculates a degree of realization in the case where the content specified by the content identifier is uploaded to the community specified by the community identifier, based on each combination of the content information and the community information, and
wherein the upload display unit associates and displays, for the community identifier of each community, the degree of realization with the content specified by the content identifier received in the first identifier reception unit.

2. The portable communication terminal according to claim 1, further comprising:
  a second identifier reception unit that, after the community identifier is displayed to be distinguishable, receives a designation of the community identifier; and
  an upload execution unit that uploads the content specified by the content identifier received in the first identifier reception unit to the community specified by the community identifier received in the second identifier reception unit.

3. A portable communication terminal comprising:
  a display unit;
  a memory that stores content information about content and community information about a community that is an upload destination of the content;
  an identifier display unit that displays on the display unit a content identifier capable of identifying the content and a community identifier capable of identifying the community;
  a first identifier reception unit that receives a designation of the community identifier;
  an upload determination unit that determines whether upload of the content specified by each content identifier to the community specified by the received community identifier is possible, based on the content information and the community information; and
  an upload display unit that displays the content identifier of the content determined as being uploadable to be distinguishable from another content identifier,
  wherein the upload determination unit calculates a degree of realization in the case where the content specified by the content identifier is uploaded to the community specified by the community identifier, based on each combination of the content information and the community information, and
  wherein the upload display unit associates and displays, for the content identifier of each content, the degree of realization with the community specified by the community identifier received in the first identifier reception unit.

4. The portable communication terminal according to claim 3, further comprising:
  a second identifier reception unit that, after the content identifier is displayed to be distinguishable, receives a designation of the content identifier; and
  an upload execution unit that uploads the content specified by the content identifier received in the second identifier reception unit to the community specified by the community identifier received in the first identifier reception unit.

5. The portable communication terminal according to claim 1,
  wherein the content information includes a reproducing time of content,
  wherein the community information includes a time limit on the reproducing time of content, and
  wherein the upload determination unit determines whether upload is possible based on the reproducing time of content and the time limit of the community.

6. The portable communication terminal according to claim 1, wherein the memory stores the content.

7. The portable communication terminal according to claim 1,
  wherein the upload determination unit calculates the degree of realization by integrating a weighting value to one or more parameters selected from a group including whether upload is possible, whether re-encoding is necessary and whether demultiplexer (DEMUX) and multiplexer (MUX) are necessary.

8. The portable communication terminal according to claim 1,
  wherein the upload determination unit performs the determination in response to a selection of the content identifier or a selection of the community identifier.

9. The portable communication terminal according to claim 1,
  wherein the upload display unit displays whether the upload is possible or the degree of realization by coloring the identifier.

10. The portable communication terminal according to claim 1, further comprising a virtual display unit that virtually displays a looking state when a selected content is uploaded to a selected community.

11. A communication method comprising:
  storing content, content information about the content and community information about a community that is an upload destination of the content;
  displaying on a display unit a content identifier capable of identifying the content and a community identifier capable of identifying the community;
  receiving a designation of the content identifier;
  determining whether upload of the content specified by the received content identifier to the community specified by each community identifier is possible, based on the content information and the community information;
  displaying the community identifier of the community determined as being uploadable to be distinguishable from another community identifier;
  calculating a degree of realization in the case where the content specified by the content identifier is uploaded to the community specified by the community identifier, based on each combination of the content information and the community information; and
  associating and displaying, for the community identifier of each community, the degree of realization with the content specified by the content identifier received in the first identifier reception unit.

12. A non-transitory computer-readable medium having a control program stored thereon and readable by a computer included in a portable communication terminal having a memory which stores content, content information about the content and community information about a community that is an upload destination of the content, the program when executed by the computer, causing the computer to perform operations comprising:
  displaying a content identifier capable of identifying the content and a community identifier capable of identifying the community;
  receiving a designation of the content identifier;
  determining whether upload of the content specified by the received content identifier to the community specified by each community identifier is possible, based on the content information and the community information;
  displaying the community identifier of the community determined as being uploadable to be distinguishable from another community identifier; and
  calculating a degree of realization in the case where the content specified by the content identifier is uploaded to the community specified by the community identifier, based on each combination of the content information and the community information; and
  associating and displaying, for the community identifier of each community, the degree of realization with the content specified by the content identifier received in the first identifier reception unit.

\* \* \* \* \*